United States Patent Office 2,923,711
Patented Feb. 2, 1960

2,923,711

2-BENZHYDRYLIDINE-Δ³-TROPENE AND LOWER ALKYL HALIDE QUATERNARIES

Harold E. Zaugg, Lake Forest, and Raymond J. Michaels, Jr., Mundelein, Ill., assignors to Abbott Laboratories, North Chicago, Ill., a corporation of Illinois No Drawing. Application March 20, 1958
Serial No. 722,636

4 Claims. (Cl. 260—292)

This invention relates to an ester alkaloid derivative, particularly a derivative of tropene and its non-toxic salts.

The tropene derivative of this invention contains a double bond between the 3 and 4-carbon positions in the ring, and a benzhydrylidine group at the 4-position as represented by the following structure

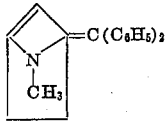

The name assigned to the foregoing structure is 2-benzhydrylidine-Δ³-tropene. The compound of this invention is prepared by initially reacting cocaine with a phenyl Grignard reagent to prepare the tropane derivative

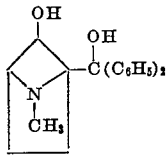

Dehydration of said tropane derivative produces 2-benzhydrylidine-Δ³-tropene. The quaternary ammonium salt of the foregoing compound is prepared by adding thereto a methyl halide. Such salts are also intended to fall within the scope of the inventive disclosure. The novel base and its non-toxic quaternary ammonium salts are useful as antispasmodics.

The following examples are presented to illustrate the preparation of the foregoing novel compounds but it should be understood that such are not intended to represent an exclusive embodiment thereof.

EXAMPLE I

*Diphenyl-(3-hydroxy-2-tropyl)-carbinol*

To a stirred solution of 0.7 mole of phenylmagnesium bromide in 600 ml. of ether is added a solution of 0.088 mole of cocaine base in 500 ml. of dry ether. The mixture is stirred and refluxed for 18 hours. After cooling, a solution of 50 grams of ammonium chloride in 200 ml. of water is added dropwise to the stirred reaction mixture and the product is isolated to give 15.4 grams (51%) of diphenyl-(3-hydroxy-2-tropyl)-carbinol, M.P. 185–186° C., $[\alpha]_D^{27}$ −23.5°, pKa 7.49° (by titration in aqueous methanol).

Anal. calcd. for $C_{21}H_{25}NO_2$.—Calculated: C, 78.05%; H, 7.79%; N, 4.33%. Found: C, 77.98%; H, 7.72%; N, 4.31%.

EXAMPLE II

*2-benzhydrylidine-Δ³-tropene*

A mixture of 8.4 grams (0.026 mole) of diphenyl-(3-hydroxy-2-tropyl)-carbinol, 18 ml. of concentrated hydrochloric acid and 60 ml. of glacial acetic acid is refluxed for two hours and then concentrated to dryness under reduced pressure. The residue is dissolved in water and made strongly alkaline with 40% aqueous sodium hydroxide. The precipitated oil is taken up in ether and dried over anhydrous sodium sulfate. The mixture is filtered and the ether is removed by distillation followed by two distillations of the residue under reduced pressure to give 4.5 grams of 2-benzhydrylidine-Δ³-tropene, B.P. 201–203° (2.5 mm.), $N_D^{25}$ 1.6338, $[\alpha]_D^{30}$ +548°.

Anal. calcd. for $C_{21}H_{21}N$.—Calculated: C, 87.76%; H, 7.37%; N, 4.87%. Found: C, 87.94%; H, 7.59%; N, 4.91%.

EXAMPLE III

*2-benzhydrylidine-Δ³-tropene methiodide*

The base of Example II (1 gram) is dissolved in 50 ml. of methyl ethyl ketone and refluxed for two minutes with 2 grams of methyl iodide. The mixture is allowed to stand for two days, after which recrystallization from ethanol yields 0.7 gram of 2-benzhydrylidine-Δ³-tropene methiodide, M.P. 281–282° C., dec. $[\alpha]_D^{28}$ +450°.

Anal. calcd. for $C_{22}H_{24}IN$.—Calculated: C, 61.54%; H, 5.63%; N, 3.26%. Found: C, 61.57%; H, 5.86%; N, 2.97%.

Others may practice the invention in any of the numerous ways which will be suggested by this disclosure to one skilled in the art. All such practice of the invention is considered to be a part hereof provided it falls within the scope of the appended claims.

We claim:
1. 2-benzhydrylidine-Δ³-tropene.
2. 2-benzhydrylidine-Δ-³-tropene methiodide.
3. A method for preparing 2-benzhydrylidine-Δ³-tropene comprising the addition of about 2 moles of a phenyl Grignard reagent to about 1 mole of cocaine base, refluxing said mixture for about 12 hours, isolating the base, diphenyl-(3-hydroxy-2-tropyl)-carbinol, dehydrating said base with a mixture of concentrated hydrochloric acid and glacial acetic acid and isolating the base, 2-benzhydrylidine-Δ³-tropene.
4. A compound selected from the class consisting of 2-benzhydrylidine-Δ³-tropene and the non-toxic lower alkyl halide quaternary ammonium salts thereof.

References Cited in the file of this patent

UNITED STATES PATENTS

| | | |
|---|---|---|
| 2,783,236 | Grundmann et al. | Feb. 26, 1957 |
| 2,800,482 | Zrikle | July 23, 1957 |